United States Patent

Baumann et al.

Patent Number: 5,869,914
Date of Patent: Feb. 9, 1999

[54] PILOTED ASSEMBLY

[75] Inventors: David C. Baumann, Lafayette; James W. Bush, Skaneateles, both of N.Y.

[73] Assignee: Carrier Corporation, Syracuse, N.Y.

[21] Appl. No.: 957,727

[22] Filed: Oct. 24, 1997

Related U.S. Application Data

[62] Division of Ser. No. 753,629, Nov. 27, 1996, Pat. No. 5,758,404.

[51] Int. Cl.$^6$ ............................. H02K 5/00; H20K 5/10
[52] U.S. Cl. ............................................ 310/89; 310/88
[58] Field of Search ................................ 310/89, 90, 87

[56] References Cited

U.S. PATENT DOCUMENTS

| | | | |
|---|---|---|---|
| 2,819,417 | 1/1958 | Glass | 310/258 |
| 3,268,986 | 8/1966 | Lacy | 29/155.5 |
| 3,814,961 | 6/1974 | Nelson et al. | 310/87 |
| 4,118,644 | 10/1978 | Schulte et al. | 310/42 |
| 4,955,128 | 9/1990 | Sogabe et al. | 29/596 |

*Primary Examiner*—Nestor Ramirez
*Assistant Examiner*—Dang Dinh Le

[57] ABSTRACT

Two housing members and the stator are precision machined on diameters and assembled such that the machined diameters coact to locate the members which then serve as a reference location for the subsequently assembled parts. The present invention reduces the number of critical machined features compared to a piloted assembly.

3 Claims, 3 Drawing Sheets

PILOTED ASSEMBLY

This application is a division of application Ser. No. 08/753,629 filed Nov. 27, 1996, now U.S. Pat. No. 5,758,404.

BACKGROUND OF THE INVENTION

In devices such as compressors it is common to have the motor, as well as the pump structure, in a semi-hermetic casing or housing with the motor supported by straddled bearings. The motor structure must be accurately located with respect to the pump structure for proper operation and to avoid undue stress and wear. Conventional assemblies of this type use, for example, locating features such as dowel pins to make the critical alignment of the housing components. This adds critical features to the machining and inspection process. It also increases capital costs for machining and inspection.

SUMMARY OF THE INVENTION

The motor housing is provided with a machined diameter which serves as a basic reference location. The stator is provided with a machined diameter and is pressed into the machined diameter of the motor housing. A subassembly is made up of the shaft, the rotor and the cone assemblies of the two housings. The cups of the two bearings are respectively located in bores in the motor and rotor bearings. The subassembly is then inserted into the motor housing with the rotor being located within the bore in the stator while the cone of the motor housing bearing is positioned in the cup located in the bore in the motor housing. The resulting assembly which is made up of the subassembly and motor housing is assembled to the rotor housing by inserting the inner cone and rollers of the rotor housing bearing into the outer cup located in the bore in the motor housing as the overhung portion of the stator is inserted into the machined diameter of the rotor housing. In this manner, a single machined diameter on the stator accomplishes the alignment of the bearings in the two housings through the coaction of the machined diameters on the motor housing and stator. This method of assembly eliminates two dowel pins and their associated precision machined holes.

It is an object of this invention to reduce the number of critical machined features in a piloted assembly.

It is a further object of this invention to achieve alignment using features on the motor itself to effect alignment of the housings. These objects, and others as will become apparent hereinafter, are accomplished by the present invention.

Basically, two housing members and the stator are precision machined on diameters and press fit such that the machined diameters coact to locate the members which then serve as a reference for subsequently assembled parts.

BRIEF DESCRIPTION OF THE DRAWINGS

For a fuller understanding of the present invention, reference should now be made to the following detailed description thereof taken in conjunction with the accompanying drawings wherein.

DESCRIPTION OF THE PREFERRED EMBODIMENT

Figure 1:
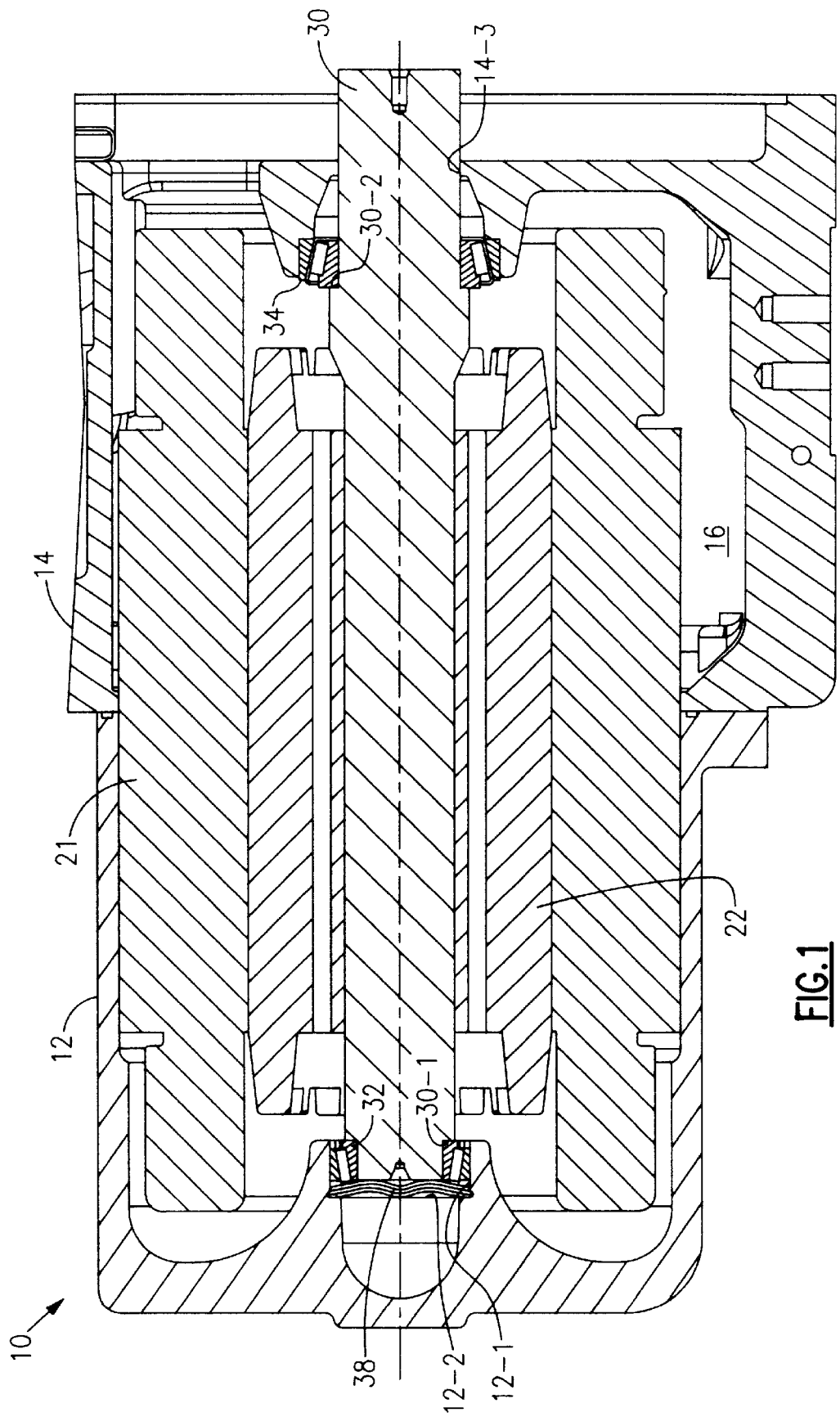
FIG. 1 is a sectional view of a portion of a screw compressor assembled according to the teachings of the present invention.
Figure 2:
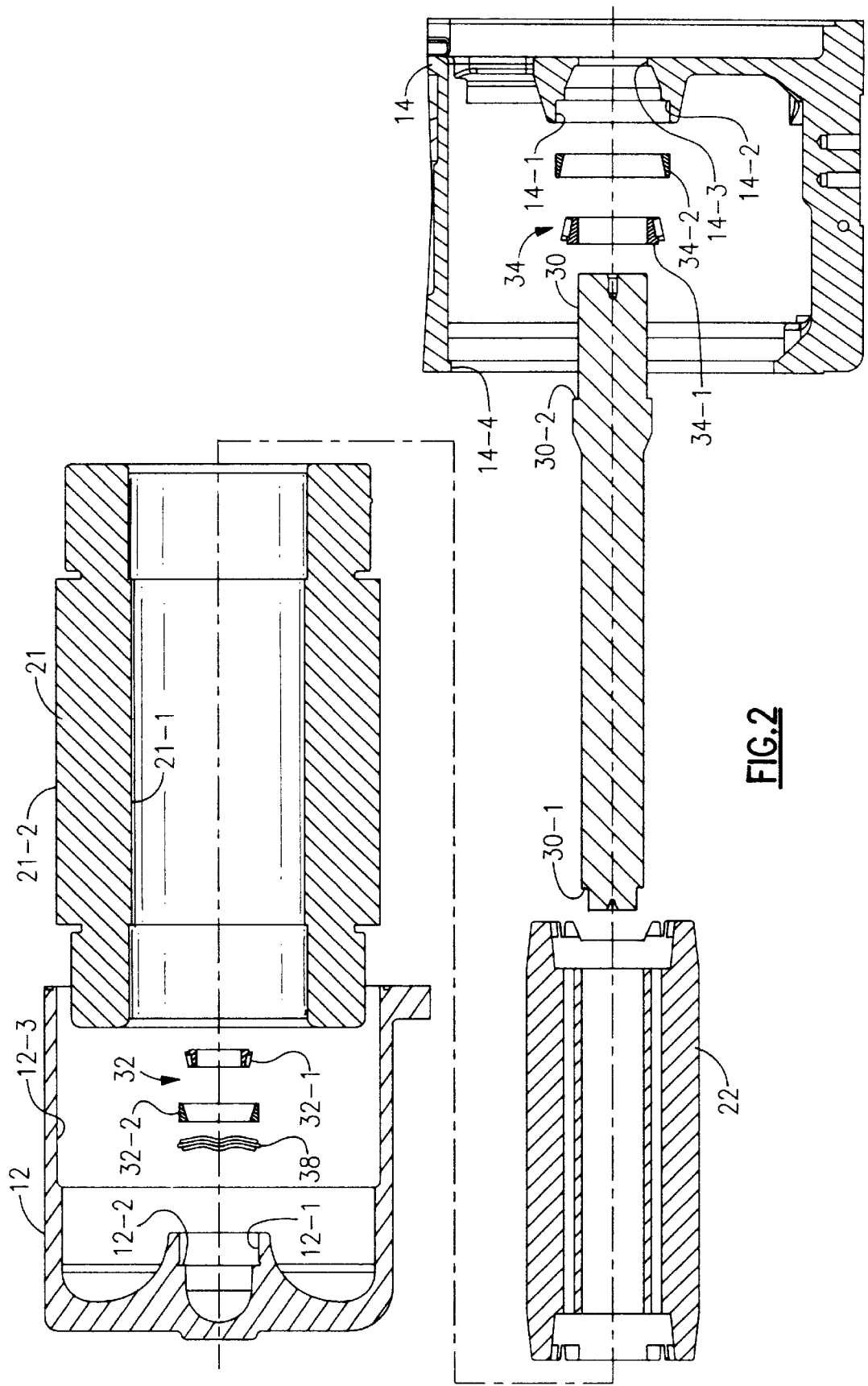
FIG. 2 is an exploded view corresponding to FIG. 1.

In FIGS. 1 and 2, the numeral 10 generally designates a semi-hermetic screw compressor having a motor housing 12 and a rotor housing 14 which coact to define a motor chamber 16. A motor made up of stator 21 and rotor 22 is located in motor chamber 16. Rotor 22 is shrunk fit onto or otherwise suitably secured to shaft 30 which is rotatably supported by straddled bearings 32 and 34. Bearing 32 and stack of wavy springs 38 are received in bore 12-1 of motor housing 12 with springs 38 supported by shoulder 12-2 and tending to bias bearing 32 and thereby shaft 30 towards rotor housing 14. Bearing 34 is received in bore 14-1 of rotor housing 14 and is supported by shoulder 14-2. Shoulders 30-1 and 30-2 on shaft 30 engage bearings 32 and 34, respectively. Shaft 30 extends through bearing 34 and bore 14-3 into a gear housing (not illustrated) where it engages a drive gear (not illustrated).

Figure 3:
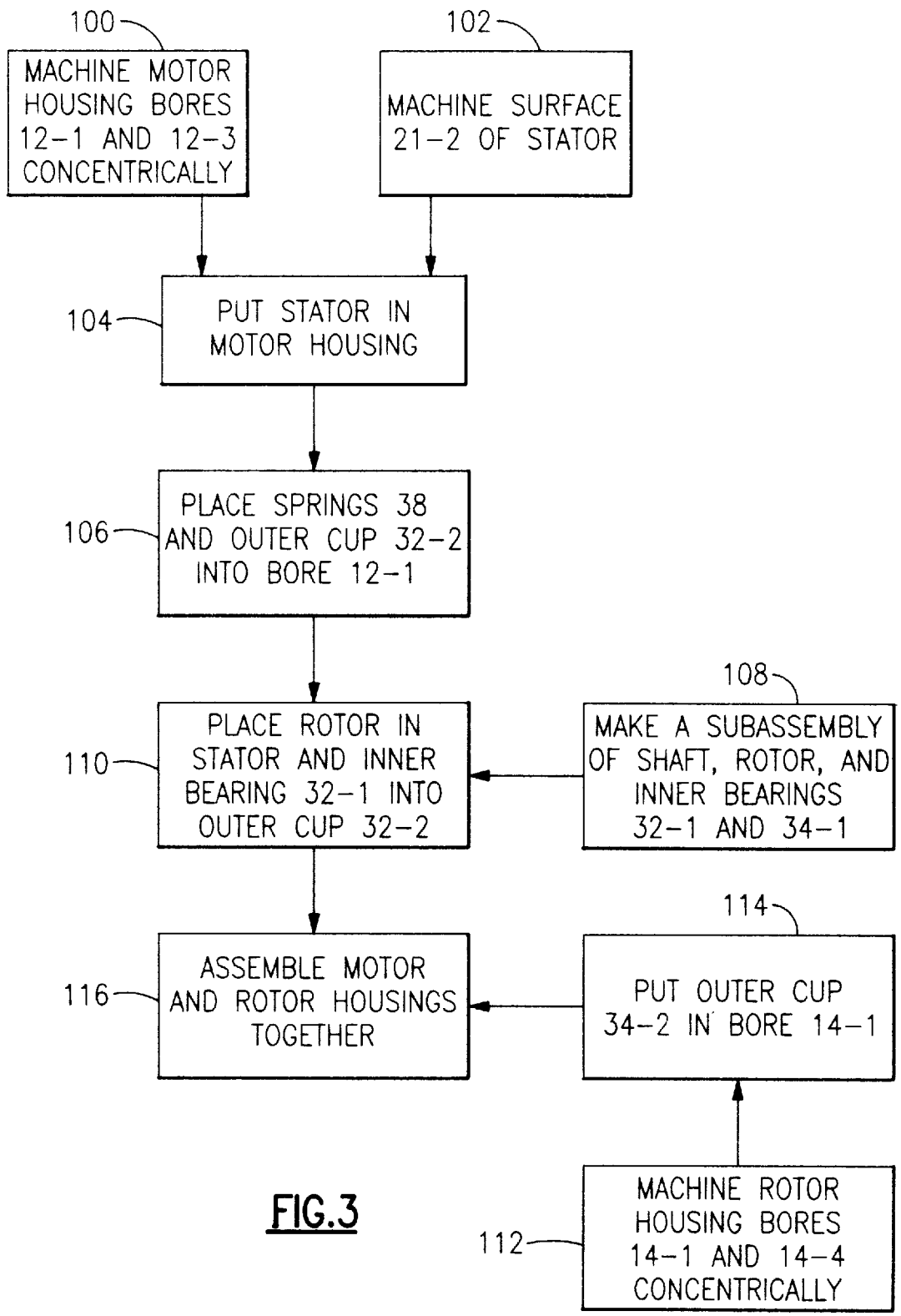
FIG. 3 is a flow diagram showing the assembly steps of the present invention.

Referring specifically to FIG. 2, it will be noted that bearings 32 and 34 include inner cones and rollers 32-1 and 34-1, respectively, as well as outer cups 32-2 and 34-2, respectively. Accordingly, inner cones and rollers 32-1 and 34-1 can be separately assembled with respect to corresponding outer cups 32-2 and 34-2, respectively, and vice versa The steps for the assembly of the motor and related structure for a screw compressor is shown in FIG. 3. As indicated by box 100, the diameter of the bore 12-3 of motor housing 12 is precision machined so as to provide a reference for locating other members. Bore 12-1 is concentrically machined with respect to bore 12-3 so as to properly locate bearing 32. The diameter of outer cylindrical surface 21-2 of stator 21 is precision machined, as indicated by box 102, so as to be accurately received in bore 12-3. As indicated by box 104, stator 21 is placed in motor housing 12 such that surface 21-2 is received in and engages bore 12-3. Spring 38 and outer cup 32-2 are placed in bore 12-1, as indicated by box 106. A subassembly is made from shaft 30, rotor 22, and inner bearings 32-1 and 34-1 as indicated by box 108. The subassembly of box 108 is placed such that rotor 22 is located in stator 21 and inner bearing 32-1 is received in outer cup 32-2, as indicated by box 110. Rotor housing bores 14-1 and 14-4 are machined concentrically, as indicated by box 112. Bore 14-4 must be of essentially the same diameter as bore 12-3 since they both receive and engage surface 21-2 of stator 21. In actual practice, bore 12-3 is in a tight interference fit with surface 21-2 whereas bore 14-4 is in a looser, slip fit with surface 21-2. Accordingly, bore 14-4 is slightly larger than bore 12-3 by an amount necessary to accommodate the looser fit. Outer cup 34-2 is placed in bore 14-1, as indicated by box 114. Motor housing 12 and rotor housing 14 are assembled together such that stator 21 is received in housing 14 with surface 21-2 engaging bore 144 and with inner bearing 34-1 received in outer cup 34-2, as indicated by box 116.

From the foregoing description it should be clear that precision machined surface 21-2 of stator 21 coacts with precision machined bores 12-3 and 14-4 to precisely locate the motor housing 12 and the rotor housing 14 with respect to the stator 21 as well as to each other. Because bores 12-1 and 14-1 are machined concentrically with bores 12-3 and 14-4, respectively, the bearings 32 and 34 and therefore shaft 30 are accurately located.

Although a preferred embodiment of the present invention has been illustrated and described, other changes will occur to those skilled in the art. For example, rather than having a machined stator outer diameter, the laminations could be precision stamped and assembled so as to provide an adequately dimensioned, but non-machined outer diameter since the ultimate criterion is the precision of the dimension of the outer diameter. Although the present invention has been described in terms of a two-piece roller bearing, the two main alternates are single-piece rolling bearings, such as ball bearings, and sleeve (or journal) type bearings. In the case of the single-piece ball bearings, the entire assembly can be installed either on the shaft or in the housing, even alternately from one end to the other. In the case of sleeve bearings, again a single bearing insert can be installed either on the shaft, in the housing (most likely), or alternately from one end to the other. In this case, the insert may or may not be machined after installation. If it is not machined, the qualifying diameter is the bore into which (or the diameter over which) it is pressed. If it is machined, the qualifying diameter becomes the machined surface of the bearing itself. It is therefore intended that the scope of the present invention is to be limited only by the scope of the appended claims.

What is claimed is:

1. A piloted assembly comprising:

a first housing member having first and second precision machined bores which are concentric;

a second housing member having first and second precision machined bores which are concentric;

a stator having a bore and a precision outer diameter;

said stator located in said first bore of said first housing member in a tight fit and in said first bore of second housing member with said housing members being secured together in a fluidtight relationship;

bearing means located in said second bores of said first and second housing members;

a shaft;

a rotor secured to said shaft;

said rotor being located in said bore of said stator with said shaft being supported by said bearing means.

2. The assembly of claim 1 wherein said first and second bores of said first and second housing members are axially spaced.

3. The piloted assembly of claim 1 wherein said tight fit is an interference fit.

* * * * *